(12) United States Patent
Sabeti et al.

(10) Patent No.: US 10,837,510 B2
(45) Date of Patent: Nov. 17, 2020

(54) THERMALLY ISOLATED COMPOSITE EXCITER RING

(71) Applicant: Bendix Spicer Foundation Brake LLC, Elyria, OH (US)

(72) Inventors: Manouchehr Sabeti, North Olmstead, OH (US); Kevin D Hantak, Elyria, OH (US); James A Seaman, Avon, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 162 days.

(21) Appl. No.: 15/949,129

(22) Filed: Apr. 10, 2018

(65) Prior Publication Data

US 2019/0309810 A1 Oct. 10, 2019

(51) Int. Cl.

| F16D 65/00 | (2006.01) |
|---|---|
| F16D 65/12 | (2006.01) |
| F16C 41/00 | (2006.01) |
| B60T 8/32 | (2006.01) |
| G01P 3/44 | (2006.01) |
| F16D 66/00 | (2006.01) |
| B60T 8/1761 | (2006.01) |
| F16D 65/02 | (2006.01) |
| G01P 3/487 | (2006.01) |

(52) U.S. Cl.
CPC .......... *F16D 65/127* (2013.01); *B60T 8/329* (2013.01); *F16C 41/007* (2013.01); *B60T 8/1761* (2013.01); *F16D 2065/132* (2013.01); *F16D 2066/003* (2013.01); *F16D 2200/0043* (2013.01); *F16D 2200/0047* (2013.01); *G01P 3/443* (2013.01); *G01P 3/487* (2013.01)

(58) Field of Classification Search
CPC .... B60T 8/329; F16D 2066/003; G01P 3/487; G01P 3/488
See application file for complete search history.

(56) References Cited

U.S. PATENT DOCUMENTS

| 5,200,697 A | 4/1993 | Adler et al. |
|---|---|---|
| 5,722,777 A | 3/1998 | Ouchi |
| 5,827,968 A | 10/1998 | Ouchi et al. |
| 5,850,141 A | 12/1998 | Adler |
| 6,250,811 B1 | 6/2001 | Mizukoshi et al. |
| 6,568,512 B1 | 5/2003 | Tolani |

(Continued)

FOREIGN PATENT DOCUMENTS

| DE | 10 2008 055 893 A1 | 5/2010 | |
|---|---|---|---|
| EP | 0549452 A1 * | 6/1993 | ............ G01P 3/488 |

(Continued)

OTHER PUBLICATIONS

Machine translation of EP 0549452 (no date).*

*Primary Examiner* — Nicholas J Lane
(74) *Attorney, Agent, or Firm* — Crowell & Moring LLP (57) ABSTRACT

A composite exciter ring for use in a vehicle brake system includes a base layer and a cover layer that is disposed on the base layer. The base layer is made of a ceramic material that insulates the cover layer from a heat source generated during brake activation. The cover layer is made of a plastic material and that defines openings. Each opening exposes a different part of the base layer. The ceramic material includes an additive infused therein. The additive has an effect on a magnetic field.

19 Claims, 7 Drawing Sheets

(56) References Cited

U.S. PATENT DOCUMENTS

| | | | |
|---|---|---|---|
| 6,664,780 B2 | 12/2003 | Dobbs et al. | |
| 6,675,640 B2 | 1/2004 | Ehrlich et al. | |
| 7,233,138 B2 | 6/2007 | Michalek et al. | |
| 7,267,016 B2* | 9/2007 | Pavan | G01P 3/487 324/173 |
| 7,288,930 B2 | 10/2007 | Clark | |
| 7,306,293 B2 | 12/2007 | Redgrave | |
| 8,020,676 B2 | 9/2011 | Bradley et al. | |
| 2005/0183909 A1 | 8/2005 | Rau, III et al. | |
| 2005/0212353 A1 | 9/2005 | Tolani | |
| 2016/0236658 A1 | 8/2016 | Rozza | |
| 2017/0074336 A1 | 3/2017 | Burgoon | |

FOREIGN PATENT DOCUMENTS

| | | |
|---|---|---|
| FR | 2 690 989 A1 | 11/1993 |
| GB | 2494110 A | 3/2013 |
| JP | 9-15254 A | 1/1997 |
| JP | 9-54107 A | 2/1997 |
| JP | 9-166611 A | 6/1997 |
| JP | 10-253646 A | 9/1998 |
| KR | 10-0952780 B1 | 10/2009 |
| WO | WO 2008/146998 A1 | 12/2008 |

* cited by examiner

THERMALLY ISOLATED COMPOSITE EXCITER RING

FIELD & PROBLEM

The field of endeavor of the present invention is that of exciter rings, which are also known as tone rings. That is, the field of endeavor of the present invention is not that of rings, or ring structures in general, but rather, only that of exciter rings. The problem that the present invention is reasonably pertinent to is that of joint failures that occur in exciter rings. That is, the problem that the present invention is reasonably pertinent to is not that of joint failures in general, but rather, only that of joint failures that occur in exciter rings. Nothing in this disclosure should be interpreted as expanding the field of endeavor of this invention or the problem that this invention is reasonably pertinent to, beyond that which is expressly stated above.

BACKGROUND

As used herein, the term exciter ring or tone ring means a structure that is used in antilock brake systems to determine the rate of rotation of a vehicle wheel. In antilock brake systems, the determined rotation rate of the wheel is used to determine whether a wheel slip condition exists. And, in the event that a wheel slip condition exists, the antilock brake system performs a controlled braking operation, in an effort to regain proper wheel traction. Existing exciter rings are made of materials that have high thermal conductivity

SUMMARY

The high thermal conductivity of existing exciter rings leads to joint failure of the exciter ring when installed on hubs or rotors with materials of different thermal conductivity than the exciter ring. These joint failures compromise the performance of exciter rings, leading to inaccurate readings and/or reading failures. The embodiments of the present invention are directed to an inventive exciter ring that provides a solution to the joint failure problem in existing exciter rings. The solution to this problem is achieved by an inventive composite exciter ring for use in a vehicle brake system that includes a base layer and a cover layer that is disposed on the base layer. The base layer is made of a ceramic material that insulates the cover layer from a heat source generated during brake activation. The cover layer is made of a plastic material and that defines openings. Each opening exposes a different part of the base layer. The ceramic material includes an additive infused therein, the additive having an effect on a magnetic field.

Alternatively, the solution to the joint failure problem in existing exciter rings is achieved by an inventive composite exciter ring for use in a vehicle brake system that includes a base layer, a middle layer disposed on the base layer, and a cover layer disposed on the middle layer. The base layer is made of a ceramic material that insulates the middle layer and the cover layer from a heat source generated during brake activation. The middle layer is made of a permeable material having low magnetic retentivity. The cover layer is made of a plastic material and defines openings, each opening exposing a different part of the middle layer.

Alternatively, the solution to the joint failure problem in existing exciter rings is achieved by a composite exciter ring for use in a vehicle brake system that includes a base layer and a cover layer. The base layer is made of a ceramic material. The cover layer is made of a plastic material that is disposed on the base layer. The base layer is configured to thermally insulate the cover layer from a heat source generated during operation of the vehicle brake system. The cover layer defines openings that are configured to expose first parts of the base layer, while covering second parts of the base layer, the first and second parts being arranged next to one another in an alternating fashion along a given direction. The ceramic material includes an additive infused therein that has an effect on a magnetic field.

Alternatively, the solution to the joint failure problem in existing exciter rings is achieved by a composite exciter ring for use in a vehicle brake system that includes a base layer, a middle layer, and a cover layer. The base layer is made of a ceramic material. The middle layer is made of a permeable material and that is disposed on the base layer. The cover layer is disposed on the middle layer and is made of a plastic material. The base layer is configured to thermally insulate the middle layer and the cover layer from a heat source generated during operation of the vehicle brake system. The middle layer is configured to have an effect on a magnetic field that is detectable by the vehicle brake system, detection of the signal being necessary to operate the vehicle brake system. The cover layer defines openings that are configured to expose first parts of the middle layer, while covering second parts of the middle layer, the first and second parts being arranged next to one another in an alternating fashion along a given direction.

The object, as well as the advantages, and novel features of the inventive exciter ring will become apparent from the following detailed description of embodiments, when considered in conjunction with the accompanying drawings, in which:

DETAILED DESCRIPTION OF EMBODIMENTS

Figure 1:
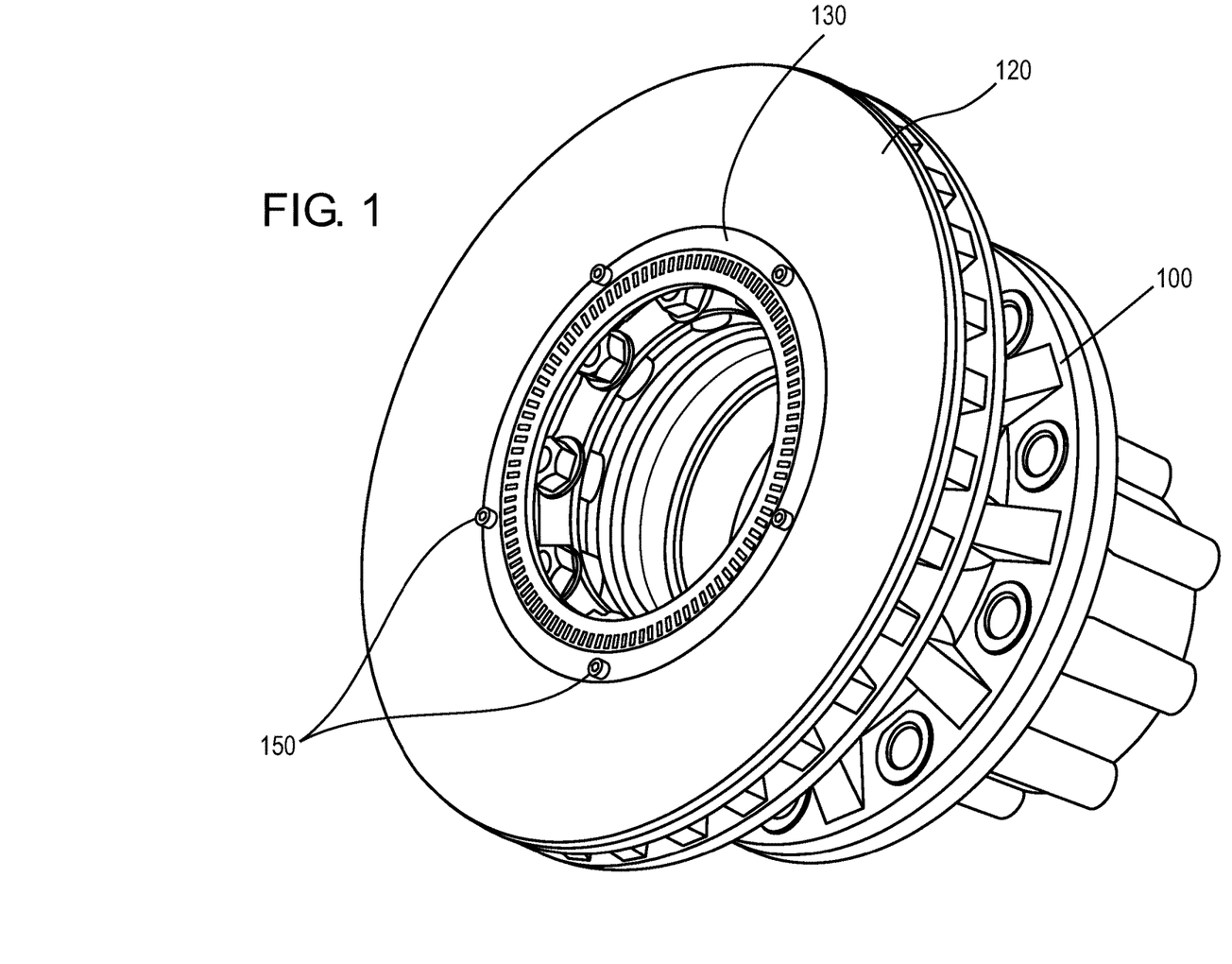
FIG. 1 is a perspective view of a brake system that includes the inventive thermally isolated composite exciter ring.

As shown in FIG. 1, the inventive brake system includes a hub 100, a rotor 120 that is coupled to the hub 100, and an exciter ring/tone ring 130, which in the embodiment of FIG. 1 is coupled to the rotor 120. The inventive brake system, however, is not limited to such configuration. For instance, in other configurations the exciter ring 130 may be coupled to the hub 100, or to any other component of a brake system that rotates in tandem with rotation of a vehicle wheel (not shown).

Figure 2A:
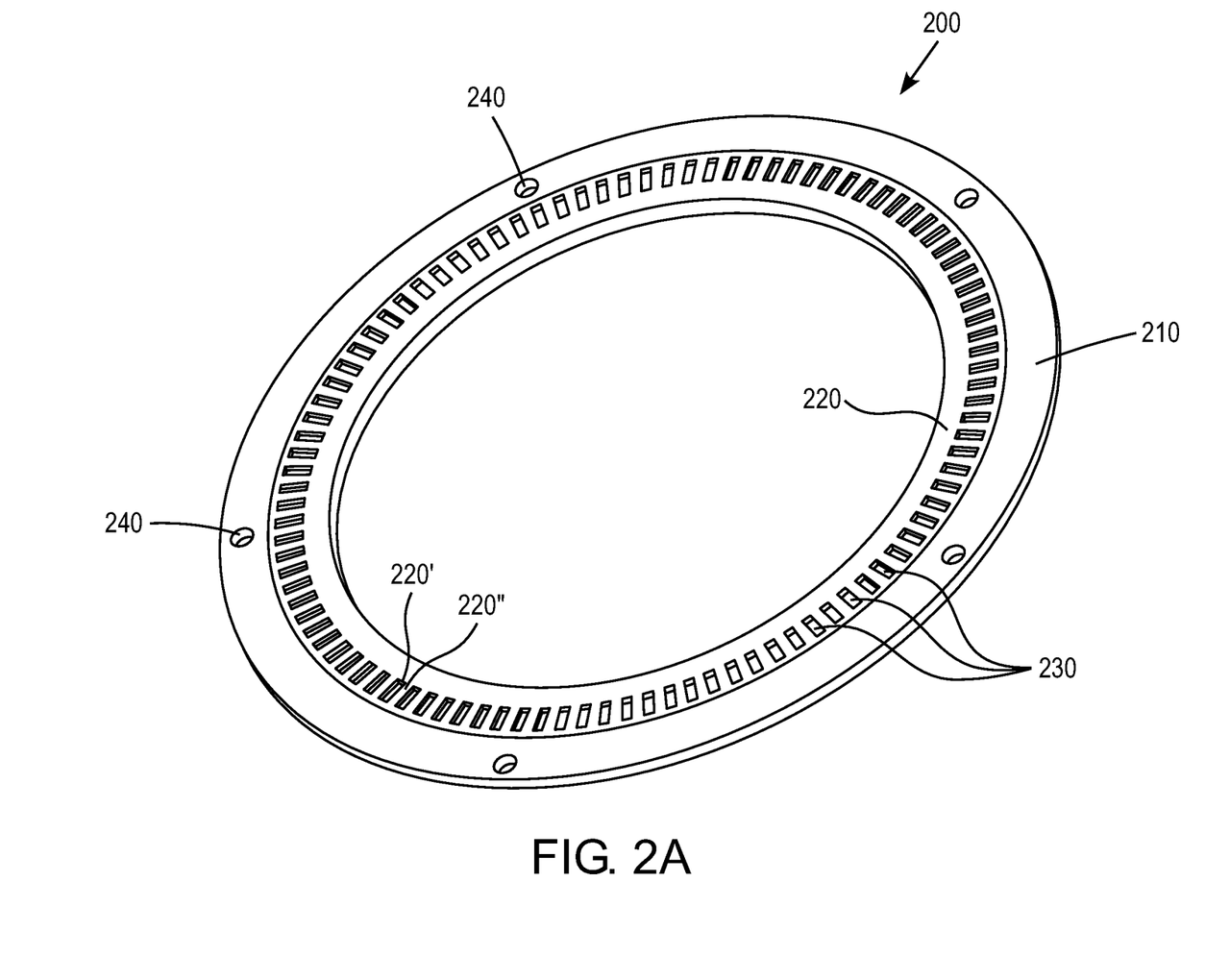
FIG. 2A is a perspective view of the inventive thermally isolated composite exciter ring.

As shown in FIG. 2A, the inventive exciter ring 200 may include at least two layers, such as a base layer 210 and a cover layer 220. The cover layer 220 may be disposed directly or indirectly in contact with the base layer 210. The base layer 210 may be made of a material that insulates the cover layer 220 from a heat source that is generated during operation of the vehicle brake system. That is, during operation of the vehicle brake system, brake pads (not shown) exert friction on the rotor 120, thereby causing the rotor 120, hub 100, and vehicle wheel (not shown) to cease rotation, and bringing the vehicle to a stop.

This heat generated at the brake rotor 120, is transferred to the brake components near the rotor 120, including the exciter ring 130/200. In the inventive brake system, however, the base layer 210 is made of a material that provides heat insulation, so that heat generation during an operation of the brake system is not transferred to the exciter ring 130/200.

The heat insulating material of the base layer 210 may be a ceramic material. Such a ceramic material may be, for example, Silicon Carbide (SiC), Aluminum Nitride, Sapphire, Alumina, Silicon Nitride, Cermet, Yttria, Mullite, Fosterite, Cordierite, Zirconia, or Steatie. The ceramic material, however, need not be limited to the foregoing disclosure, and may in fact be any ceramic material having a thermal conductivity that is lower than 120 W/(mk). Further, the heat insulating material need not be limited to a ceramic material. In fact, the heat insulating material may be any material having a thermal conductivity that is lower than 120 W/(mk).

As shown in FIG. 2A, the inventive exciter ring 200 also includes a cover layer 220. This cover layer 220 may be disposed directly or indirectly on the base layer 210. Advantageously, because the base layer 210 thermally insulates the cover layer 220 from heat, the cover layer 220 may be made of any desired material. For instance, in one embodiment the cover layer 220 may be made of a resin material, thereby reducing production costs and weight of the exciter ring 200. In some embodiments the resin material may be a plastic such as polyethylene terephthalate, or high or low density polyethylene. The cover layer 220, however, need not be limited to a resin or plastic, and may in fact be made of virtually any material known to those of ordinary skill in the art, given that the cover layer 220 is thermally insulated by the base layer 210.

The cover layer 220 may define one or more openings 230. These openings 230 expose different parts of the base layer 210. That is, in one embodiment the cover layer 220 may fully cover part of the base layer, such as the most radially inward section of the inventive exciter ring 200 of FIG. 2A, while adjacent thereto defining one or more openings 230 that expose different sections of the base layer 210. As can be seen in FIG. 2A, the cover layer 220 defines the openings 230 in an alternating fashion. That is, the cover layer 220 includes first parts 220' which expose the base layer, and second parts 220" that cover the base layer 210. And, these first parts 220' and second parts 220" may be arranged next to one another in an alternating fashion along a radial direction of the inventive exciter ring 200.

Figure 3:
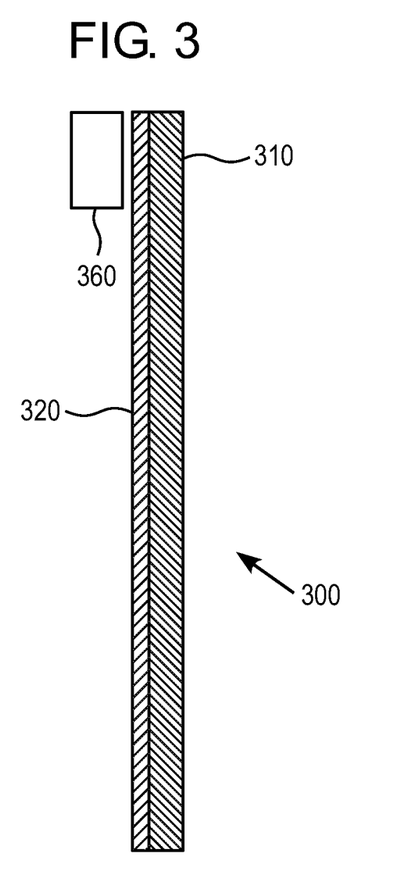
FIG. 3 is a side view of the inventive thermally isolated composite exciter ring.
Figure 4A:
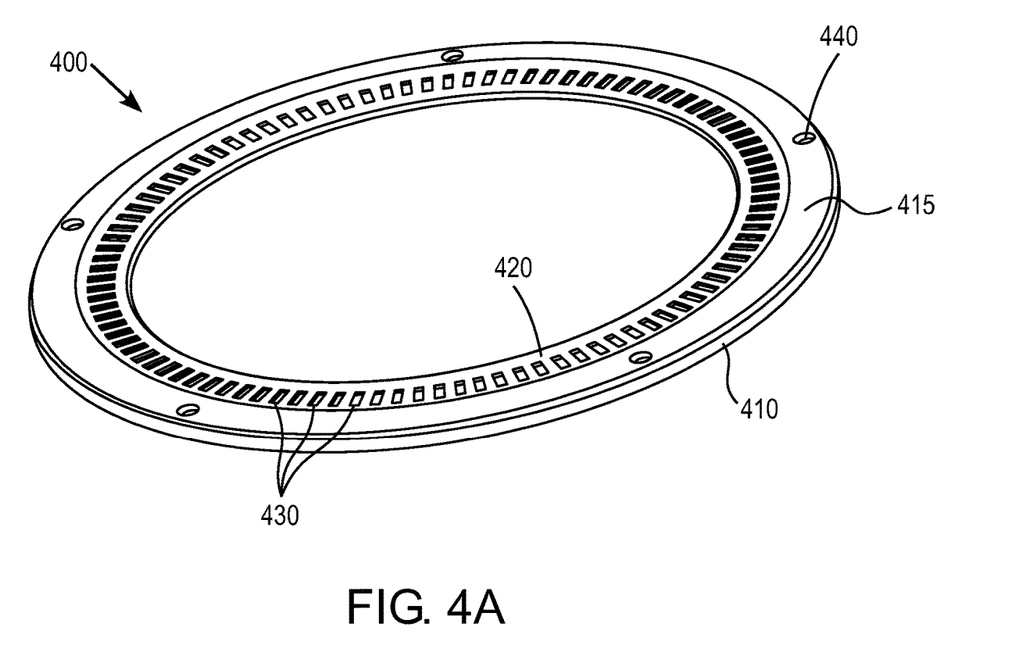
FIG. 4A is another perspective view of the inventive thermally isolated composite exciter ring.
Figure 4B:
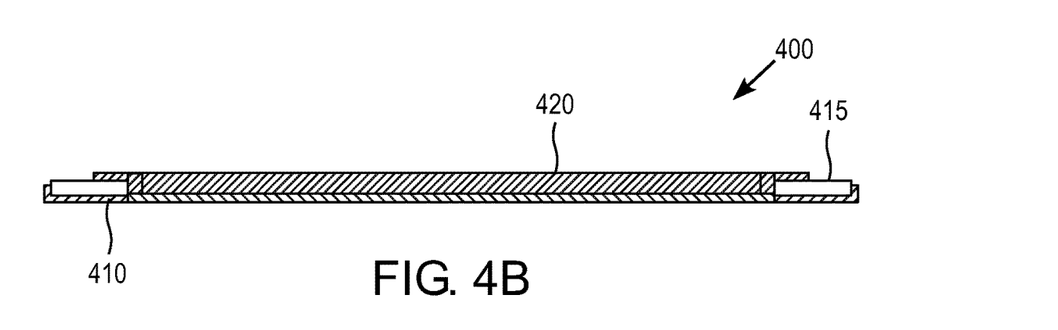
FIG. 4B is a cross sectional view of the inventive thermally isolated composite exciter ring.
Figure 4C:
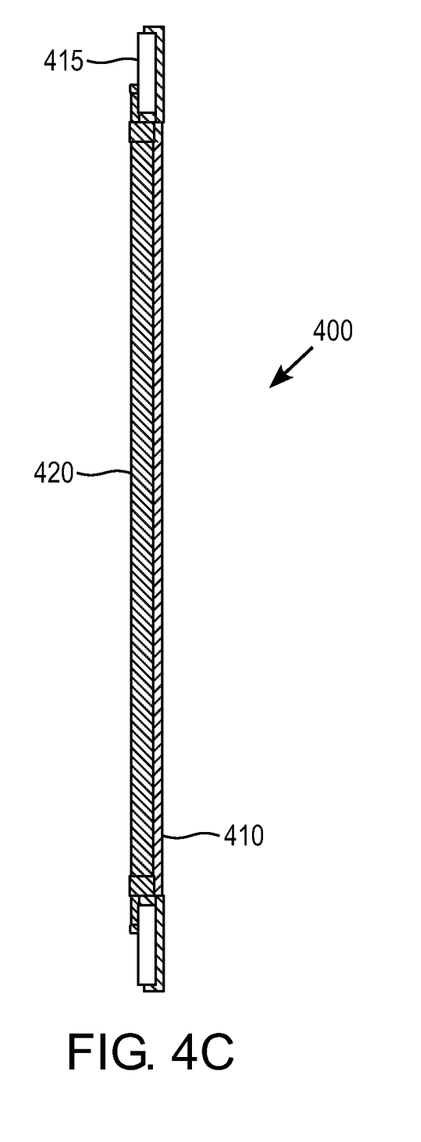
FIG. 4C is another cross sectional view of the inventive thermally isolated composite exciter ring.
Figure 4D:
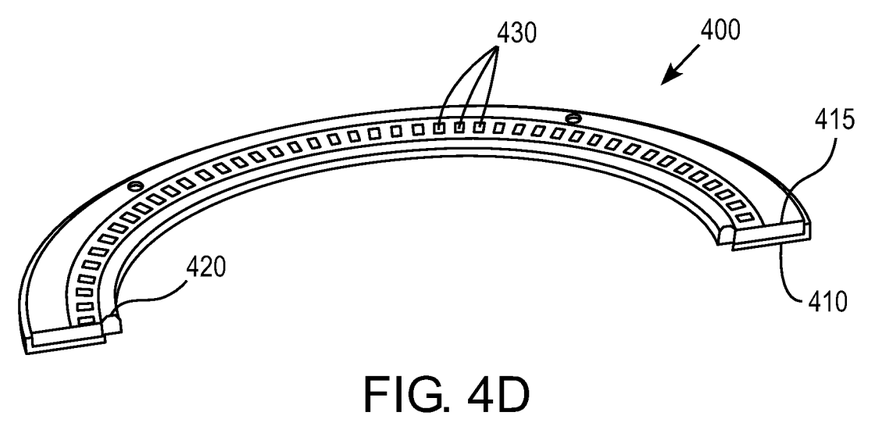
FIG. 4D is another perspective view of the inventive thermally isolated composite exciter ring.
Figure 4E:
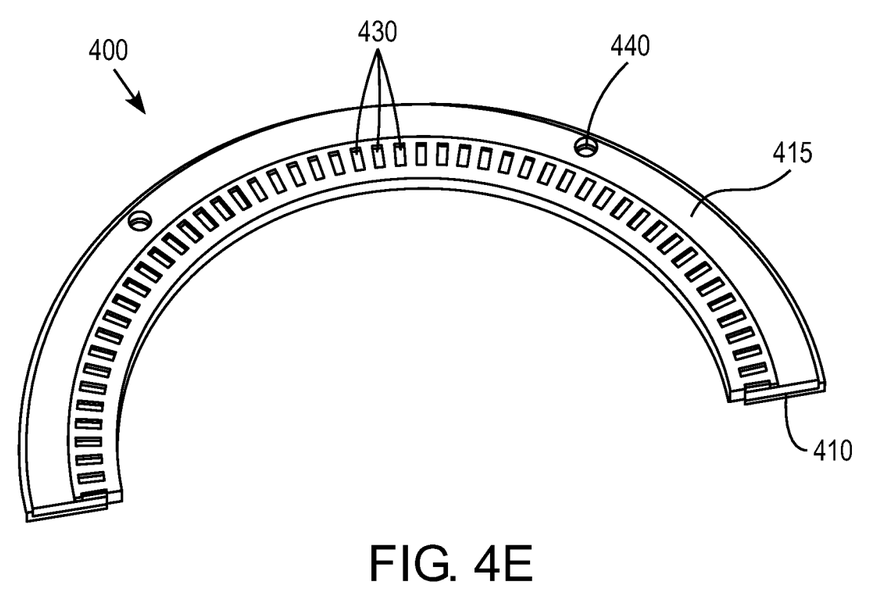
FIG. 4E is another perspective view of the inventive thermally isolated composite exciter ring.

Further, the base layer 210 may include an additive (not shown) that is infused therein. The additive may be any material that is capable of having an effect on a magnetic field, when the exciter ring interacts with a sensor 360 (FIG. 3). For instance, sensor 360 generates a magnetic field. As the exciter ring 300 is passed by the sensor 360, the sensor 360 generates a sinusoidal voltage corresponding to the distance the sensor 360 is from the additive portion of the exciter ring 300 and the number of openings 230 in the cover 220 layer exposing the base layer 210. Each time the exciter ring 300 moves past the sensor 360, an AC voltage "cycle" is generated. The number of AC cycles per revolution of the vehicle's wheel depends on the number of openings in the exciter ring 300, which is programmed into an antilock ECU. Using the programmed data, the ECU can calculate "vehicle speed" by analyzing the frequency of AC cycles sent by the speed sensor 360. And, using the vehicle speed, a wheel slip condition can be determined, which ultimately triggers activation of the antilock brake system.

The base layer 210 may include an additive (not shown), which may be a magnetically permeable material having a low magnetic retentivity. For instance, the additive may be free cutting steel, tempered steel, stainless steel, or a ferritic material. In addition, materials that exhibit a residual magnetism of less than 0.3% after removal of the external magnetic field are acceptable. In fact, the amount may be calculated based on a Gauss (magnetic field) reading from the sensor and the measurement of the magnetic field at the exciter ring after the sensor is removed. The inventive exciter ring 130, however, need not be limited to such configuration, and in other embodiments the additive may be any material that may occur to those having ordinary skill in the art, as long as the additive is capable of having an effect on a magnetic field, such as for example, altering the magnetic field of a magnetic field generated by a sensor when passed in close proximity to the exciter ring.

Further, the additive may be infused throughout the entire base layer 210 randomly or evenly. Alternatively, the additive may be selectively infused in only certain regions of the base layer 210, leaving certain other regions of the base layer 210 substantially devoid of any additive. The additive may be sintered or otherwise combined with the base material. As used herein, the term "substantially devoid" means an amount of additive that is incapable of have an effect on a magnetic field that is generated by a sensor when the sensor is passed in close proximity to the exciter ring.

Figure 2B:
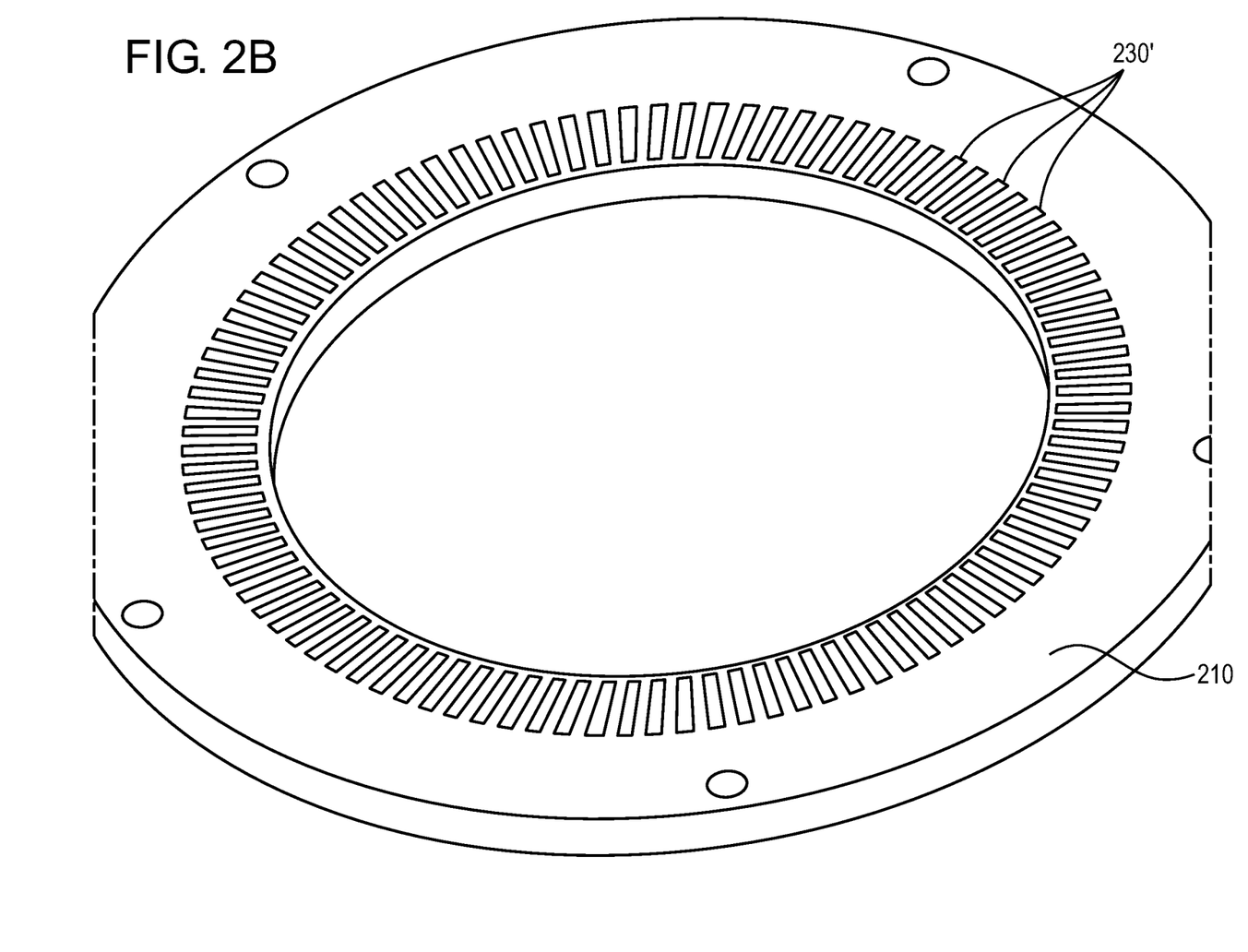
FIG. 2B is another perspective view of the inventive thermally isolated composite exciter ring.

As shown in FIG. 2B, the additive may be selectively infused only in the exposed different parts of the base layer 210 where the openings of the cover (not shown) are formed. That is, FIG. 2B depicts the base layer 210 having the additive infused only in areas of the base layer 210 that correspond to the locations of the openings in the cover (not shown), while the rest of the base layer 210 is substantially devoid of any additive. Further, this selective infusion may be applied in the region of each opening 230', or may be applied selectively to some areas of the base layer 210, in an alternating fashion, or even to groups of, for example two or three immediately adjacent areas of the base layer 210, with other groups of two or three immediately adjacent areas of the base layer 210 interposed therebetween being substantially devoid of any additive.

In fact, the additive may be selectively infused in any arrangement as may occur to those of ordinary skill in the art, as long as the exciter ring is capable of affecting a magnetic field. The amount of additive may also vary, and may in fact be any amount as may occur to those of ordinary skill in the art, as long as the amount of additive that is infused into the base layer 210 is sufficient to affect a magnetic field.

For instance, if the additive is a ferritic material the amount of ferritic material infused as an additive may be any amount that is sufficient to affect, have an effect on, or alter a magnetic field generated by a sensor that is in proximity to the exciter ring. In some embodiments, the material may be iron. The magnetic material, however, need not be limited to iron or ferrite, and may in fact be any material that is capable of affecting, having an effect on, or altering a magnetic field, that is detectable by a sensor.

The amount of additive infused into the base layer 210 may be limited by its effect on thermal conductivity of the base layer 210. That is, although the additive may be any material that is capable of affecting, having an effect on, or altering a magnetic field, a preferred additive would be one that is not only able to affect, have an effect on, or alter a magnetic field, but also one that does not increase the thermal conductivity of the base layer 210. For example, in one embodiment, the additive is infused into the base layer in an amount that does not increase the thermal conductivity of the base material 210 to above 120 W/(mk).

As shown in FIG. 2A, in the inventive exciter ring 200, the base layer 210 and the cover layer 220 may be annular and substantially ring shaped. The inventive exciter ring 200, however, need not be limited to such configuration.

As shown in FIG. 2A, in the inventive exciter ring 200, the cover layer 220 may be disposed radially inward relative to the base layer 210. With this configuration a region of the base layer 210 that is radially outward relative to the cover layer 220 is fully exposed. That is, in this configuration the base layer 210 is not fully covered by cover layer 220.

The inventive exciter ring 200, however, need not be limited to such configuration. In fact, in other embodiments (not shown), the cover layer 220 may fully overlap the entire base layer 210. Alternatively, the cover layer 220 may be disposed radially outward relative to the base layer 210. Even further, the cover layer 220 may be disposed near a radial center of the base layer 210, such that regions that are both radially outward and radially inward relative to the base layer 210 are not covered the cover layer 220.

Moreover, the composite exciter ring may include openings 240. These openings may receive fasteners that couple the exciter ring 200 to another component. For instance, as shown in FIG. 2A, the base layer 210 may define openings 240. As shown in FIG. 1, these openings 240 may receive fasteners 150 that couple the exciter ring 130 to another brake component, such as the brake rotor 120. The base layer 210 would be in contact with the other brake component when fastened.

The inventive exciter ring 130/200, however, need not be limited to such configuration. In fact, in other embodiments the openings 240 may be defined by cover layer 220, or may be partially defined by both the base layer 210 and the cover layer 220. Further, the fasteners 150 need not be limited to fastening the exciter ring to the rotor 120. In fact, in other embodiments that inventive exciter ring 200 may be fastened to the hub 100, a drum (not shown) or to any other brake component that rotates in tandem with the wheel of a vehicle.

The inventive exciter ring 200 may be implemented into various brake systems. For instance, in one embodiment the inventive exciter ring 200 may be implemented into an air disc brake system. The exciter ring 200, however, need not be limited to such implementation, and may in fact be implement into any brake system known to those having ordinary skill in the art, including drum brake systems, hydraulic brake systems, electric brake systems, or any other brake system, as long as the exciter ring 200 is able to interact with a sensor.

As shown in FIG. 3, the exciter ring 300 may be implemented in any brake system in which the exciter ring 300 interacts with a sensor 360. That is, as the exciter ring 300 rotates in tandem with the ration of the vehicle wheel (not shown), a signal, such as a sinusoidal signal that emanates from the sensor 360 is generated. Sensor 360 may be any sensor that is capable of generating a signal in response to a change in a magnetic field caused by passing the exciter ring 300 in proximity to the sensor. For instance, in one embodiment the sensor 360 may be a variable reluctance wheel speed sensor, which generates a signal and sends the signal to an ECU (not shown). The ECU in turn uses the signal to determine whether or not a wheel slip condition exists. This detection of the wheel sleep condition is necessary for the proper functioning of a brake system, such as a brake system having an anti-lock brake function.

The inventive composite exciter ring 400 may also include an additional layer. For instance, as shown in FIGS. 4A-E, the exciter ring 400 may include a base layer 410, a middle layer 415, and a cover layer 420. The middle layer 415 may be disposed directly or indirectly on the base layer 410. The middle layer 415 may me made of a material that has low magnetic retentivity. Further, the cover layer 420 may be disposed directly or indirectly on the middle layer 415.

Like the inventive exciter ring of FIGS. 1-3, the base layer 410 may be made of a thermally insulating material. This thermally insulating material may be, for example, a ceramic material that insulates both the middle layer 415 and the cover layer 420 from a heat source generated during operation of the vehicle brake system. Thus, if the inventive exciter ring 400 is coupled to rotor 120, the thermally insulating base layer 410 insulates both the middle layer 415 and the cover layer 420 from heat that is generated during operation of the brake system, and in particular heat generated at the rotor 120.

The middle layer 415 may be made of a magnetically permeable material that is capable of affecting a magnetic field. For instance, in one embodiment the middle layer 415 may be made of a free cutting steel, tempered steel or stainless steel material, or in general terms any material having low magnetic retentivity. The inventive exciter ring 400, however, need not be limited to such configuration. In fact, in other embodiments the middle layer 415 may be made of any material that may occur to those of ordinary skill in the art that affects, has an effect on, or alters a magnetic field.

Because the base layer 410 provides thermal insulation, the cover layer 420 may be made of any desired material. For instance, in one embodiment the cover 420 may be made of a resin, such as plastic. The cover 420, however, need not be limited to a resin or plastic material, and may in fact be any material as may occur to those having ordinary skill in the art.

The cover layer 420 defines openings 430, and each opening 430 exposes a different part of the middle layer 415. In some embodiments, the middle layer 415 may be disposed on the base layer 410 only in regions of the base layer 410 that are exposed by the different openings 430 of the cover layer 420. In other embodiments, however, the middle layer 415 may be of the same size, or even larger than the cover layer 420. In the inventive exciter ring 400 the base layer 410 may be made of only a thermally insulating material, such as those discussed above with reference to the exciter ring of FIGS. 1-3. That is, the base layer 410 may be free of any additive.

Like the exciter ring of FIGS. 1-3, in the inventive exciter ring 400 the base layer, middle layer, and the cover layer may be annular and substantially ring shaped. Further, in the inventive exciter ring 400 the cover layer 420 may be disposed radially inward relative to the middle layer 415 and the base layer, so that a region of the middle layer 415 that is radially outward relative to the cover layer 420 is fully exposed. The inventive exciter ring 400, however, need not be limited to such configuration, and may in fact have any configuration, including those discussed with reference to the exciter ring of FIGS. 1-3.

Further, like the exciter ring of FIGS. 1-3, the inventive exciter ring 400 may also define therein openings 440 that are configured to receive a fastener that couples the composite exciter ring to another brake component. Although these openings are shown as being defined in the middle layer 415, the openings may also be defined by all three layers.

With the above configuration, and in particular, its heat insulating capability, the inventive exciter ring prevents the problem of joint failure in exciter rings. Further, because the inventive exciter ring may be selectively infused with an additive, the inventive exciter ring is able to exhibit very low thermal conductivity, while still being able to affect a magnetic field that is detectable by a sensor. Moreover, because of its heat insulating capability, the inventive exciter ring may employ inexpensive, readily available, and very light materials at the interface between the exciter ring and its accompanying sensor, thereby reducing production costs.

Because these and other such modifications of the disclosed embodiments incorporating the spirit and substance of the invention may occur to persons of ordinary skill in the art, the invention should be construed to include everything within the scope of the appended claims and equivalents thereof.

The invention claimed is:

1. A composite exciter ring for use in a vehicle brake system, comprising:
a base layer; and
a cover layer that is disposed on the base layer, wherein
the base layer is made of a material that insulates the cover layer from a heat source generated during brake activation,
the cover layer is made of a material and that defines openings, each opening exposing a different part of the base layer, wherein
the material of the base layer includes an additive infused therein, the additive having an effect on a magnetic field, and
the base layer is made of a ceramic material.

2. The composite exciter ring according to claim 1, wherein the cover layer is made of a plastic material.

3. The composite exciter ring according to claim 2, wherein the additive is a magnetically permeable material having low magnetic retentivity.

4. The composite exciter ring according to claim 3, wherein the additive is infused only in the exposed different parts of the base layer, such that the rest of the base layer is substantially devoid of the additive.

5. The composite exciter ring according to claim 4, wherein an amount of the additive infused to the ceramic material corresponds to a minimum amount needed to alter the magnetic field.

6. The composite exciter ring according to claim 5, wherein the additive is ferritic.

7. The composite exciter ring according to claim 6, wherein the base layer and the cover layer are substantially ring shaped.

8. The composite exciter ring according to claim 7, wherein the cover layer is disposed radially inward relative to the base layer, such that a region of the base layer that is radially outward relative to the cover layer is fully exposed.

9. The composite exciter ring according to claim 8, wherein the base layer defines therein openings configured to receive a fastener that couples the composite exciter ring to another brake component.

10. An air brake system for a vehicle comprising:
a rotating member configured to rotate in response to a motion of the vehicle;
the composite exciter ring according to claim 2, wherein the composite exciter ring is coupled to the rotating member and the base layer is in contact with the rotating member; and
a sensor configured to respond to a change in its magnetic field when in proximity to the rotating base layer.

11. The air brake system according to claim 10, wherein the rotating member is one of a brake rotor, a drum, and a wheel hub.

12. A composite exciter ring for use in a vehicle brake system, comprising:
a base layer that is made of a ceramic material; and
a cover layer that is made of a plastic material and that is disposed on the base layer, wherein
the base layer is configured to thermally insulate the cover layer from a heat source generated during operation of the vehicle brake system,
the cover layer defines openings that are configured to expose first parts of the base layer, while covering second parts of the base layer, the first and second parts being arranged next to one another in an alternating fashion along a given direction, and
the ceramic material includes an additive infused therein that has an effect on a magnetic field.

13. The composite exciter ring according to claim 12, wherein the additive is infused only in the first parts where the base layer is exposed, such that the rest of the base layer is substantially devoid of the additive.

14. The composite exciter ring according to claim 13, wherein the additive is a magnetically permeable material.

15. The composite exciter ring according to claim 14, wherein an amount of the additive corresponds to a minimum amount needed to alter the magnetic field.

16. The composite exciter ring according to claim 15, wherein the additive is ferritic.

17. The composite exciter ring according to claim 16, wherein the base layer and the cover layer are substantially ring shaped.

18. The composite exciter ring according to claim 17, wherein the cover layer is disposed radially inward relative to the base layer, such that a region of the base layer that is radially outward of the cover layer is fully exposed.

19. The composite exciter ring according to claim 18, wherein the base layer defines therein openings configured to receive a fastener that couples the composite exciter ring to another brake component.

* * * * *